(12) United States Patent
Sudo et al.

(10) Patent No.: US 6,249,425 B1
(45) Date of Patent: Jun. 19, 2001

(54) WIRING STRUCTURE FOR INSTRUMENT PANEL OF VEHICLE

(75) Inventors: Hiroshi Sudo; Takashi Kobayashi; Hisashige Abe, all of Nagoya (JP)

(73) Assignees: Harness System Technologies Research, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/460,986

(22) Filed: Dec. 15, 1999

(51) Int. Cl.⁷ ........................................ H02B 1/01
(52) U.S. Cl. .................. 361/627; 361/641; 361/622; 307/10.1; 174/72 A; 439/34
(58) Field of Search .................. 361/614, 633, 361/634, 636, 641, 643, 644, 826, 827, 828; 174/72 A; 439/34; 307/10.1, 147

(56) References Cited

U.S. PATENT DOCUMENTS

| | | | |
|---|---|---|---|
| 4,122,357 | * 10/1978 | Sumida ............................. | 307/10.1 |
| 4,849,967 | * 7/1989 | Harris ............................... | 370/85 |
| 4,910,641 | * 3/1990 | Yanase .............................. | 361/659 |
| 4,942,499 | * 7/1990 | Shibata et al. ..................... | 361/826 |
| 5,428,535 | * 6/1995 | Katsumata et al. ............... | 364/424.05 |
| 5,502,615 | * 3/1996 | Kubota et al. ..................... | 361/647 |
| 5,508,689 | * 4/1996 | Rado et al. ........................ | 340/825.06 |
| 5,627,409 | 5/1997 | Nishitani . | |
| 5,663,866 | * 9/1997 | Ichikawa et al. .................. | 361/643 |

FOREIGN PATENT DOCUMENTS

| | | |
|---|---|---|
| 0 714 812 | 6/1996 | (EP) . |
| 0 875 422 | 11/1998 | (EP) . |
| 0 894 674 | 2/1999 | (EP) . |
| 361188249A | * 8/1986 | (JP) . |
| 363247112A | * 10/1988 | (JP) . |
| 401190551A | * 7/1989 | (JP) . |
| 403032953A | * 2/1991 | (JP) . |

* cited by examiner

Primary Examiner—Leo P. Picard
Assistant Examiner—Boris L. Chervinsky
(74) Attorney, Agent, or Firm—Oliff & Berridge, PLC

(57) ABSTRACT

A plurality of sub-modules are constituted by connecting a plurality of electronic units among electronic units for an instrument panel to a common control unit. A control unit for each sub-module is connected to a common instrument panel harness to permit multiple communication among the control units.

5 Claims, 9 Drawing Sheets

WIRING STRUCTURE FOR INSTRUMENT PANEL OF VEHICLE

BACKGROUND OF THE INVENTION

The present invention relates to a wiring structure for an instrument panel of a vehicle.

Hitherto, wiring for an instrument panel has been performed such that electronic units are disposed in a multiplicity of portions of the instrument panel. Then, a wire harness for an instrument panel stretched in the form of a net is disposed on the reverse side of the instrument panel. Moreover, connectors provided for each end of the wire harness and connectors of the electronic units are sequentially connected to each other.

The foregoing wiring structure must be formed such that all of the operations for mounting each electronic unit on the instrument panel and the operations for connecting each electronic unit to the wire harness are performed on a manufacturing line for only the instrument panel. The number of electronic units provided for the instrument panel has yearly been increased. Therefore, the amount of labor required to perform the operations for mounting the electronic units and the wiring operations have been enlarged. Thus, assembly cannot easily be performed. Hence it follows that an excessively long time is required to manufacture the instrument panel on the manufacturing line. As a result, automatization of the assembly and improvement in the efficiency have undesirably been inhibited.

As the number of the electronic units is increased, the shape of the wire harness for the instrument panel connecting the electronic units becomes more complicated. Also the weight of the wire harness has excessively been enlarged. Therefore, the wire harness cannot easily be handled.

When the types of the electronic units and the layout of the electronic units are changed to realize a required grade, the wire harness for the instrument panel must be changed to correspond to the type and layout. Thus, there arises a problem in that the conventional technique is uneconomical and adaptation cannot easily be permitted.

SUMMARY OF THE INVENTION

In view of the foregoing, an object of the present invention is to provide a wiring structure for an instrument panel of a vehicle with which wiring can be simplified, the weight of the wiring can be reduced and the wiring operation can be flexibly adapting to changes in the grade or the like.

As a means for solving the foregoing problems, according to one aspect of the present invention, there is provided a wiring structure for an instrument panel of a vehicle arranged to be provided for a plurality of electronic units disposed in the instrument panel of a vehicle, the wiring structure for an instrument panel of a vehicle comprising: a plurality of sub-modules constituted by connecting a plurality of electronic units for the instrument panel to a common control unit, wherein the control units of the sub-modules are connected to a common wire harness so that multiple communication is performed among the plural control units.

The foregoing structure permits multiple communication to be performed between the control units for controlling the plural electronic units in the sub-modules. Thus, a communication network connecting the electronic units of all of the sub-modules is formed. As compared with the conventional structure in which each electronic unit is individually connected to the wire harness, the structure according to the present invention is able to considerably simplify the shape and structure of the wire harness. Moreover, the wiring operation can be facilitated. When the types and layout of the electronic units to be adapted to a required grade are changed, adaptation can be performed by simply changing the sub-module. Thus, the adapting operation can be facilitated. Moreover, a common wire harness can be employed.

Each sub-module and the wire harness can directly be connected to each other through electric wires or the like. A structure may be employed in which a connector is provided for each sub-module, connectors which are detachably connected to the connectors of the sub-modules are provided for the wire harness and the connections of the connectors enable the control units of the sub-modules to be connected to one another such that multiple communication is permitted. In the foregoing case, the sub-module can easily be changed.

A structure may be employed in which an electric junction box which is connected to electronic units for a vehicle except for the electronic units for the instrument panel is connected to the wire harness so that multiple communication is performed between a control unit of the electronic junction box and the control unit of at least one sub-module. Thus, a wide network including the other electronic units as well as the electronic units for the instrument panel can be formed with a simple structure.

When the wire harness is allowed to pass close by the instrument panel so as to be arranged in the widthwise direction of the vehicle, the electric junction box is connected to each of two ends of the wire harness and the control unit of each sub-module is connected to an intermediate portion of the wire harness, the wiring structure using the wire harness can be simplified and rationalized.

DETAILED DESCRIPTION OF THE PREFERRED EMBODIMENTS

An embodiment of the present invention will now be described with reference to the drawings.

Figure 1:
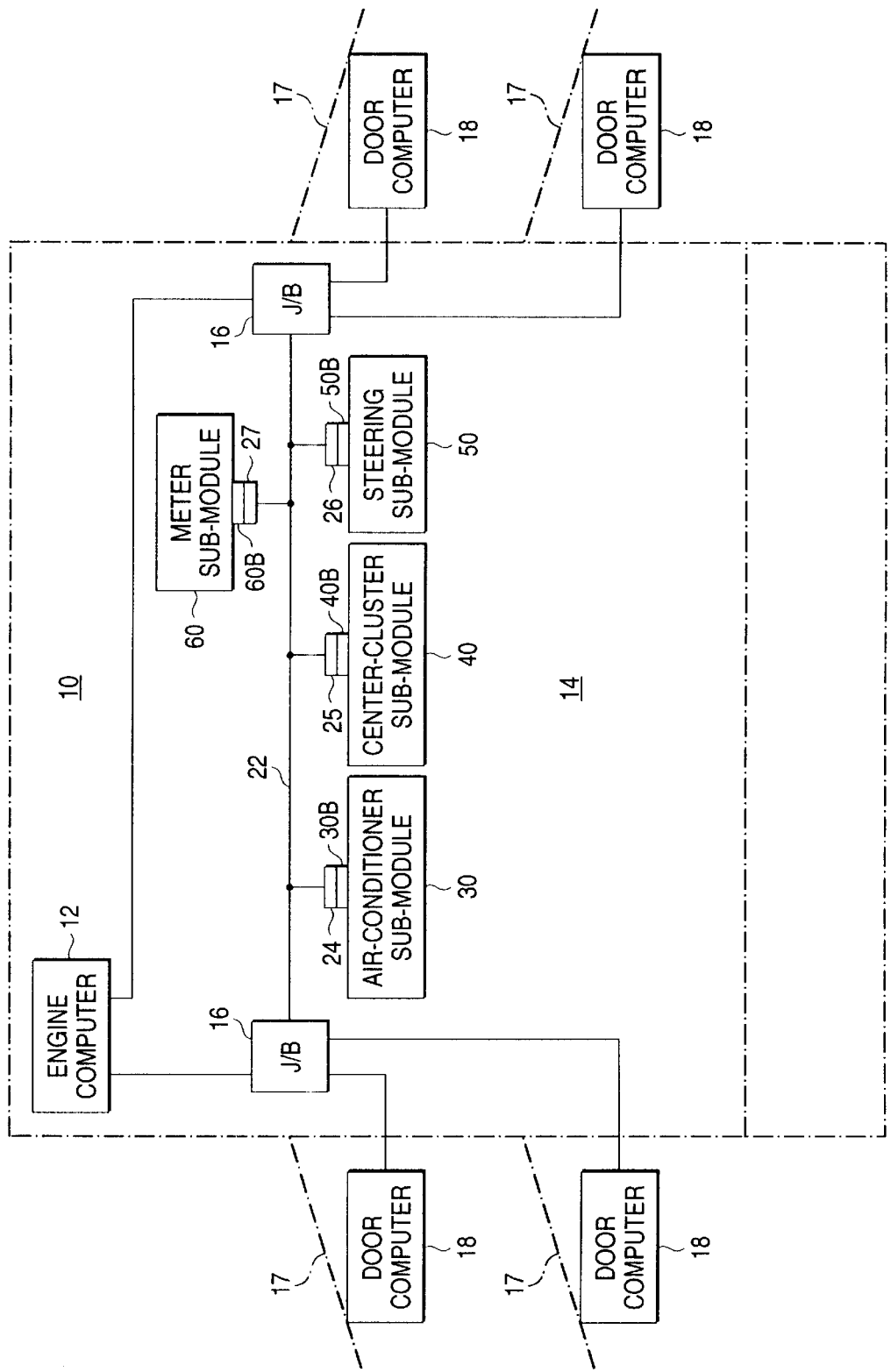
FIG. 1 is a diagram showing a wiring structure for the overall portion of a vehicle according to the present invention.

An engine computer 12 for controlling an engine is provided for an engine room 10 formed in the front portion of the vehicle shown in FIG. 1. An electric junction box (a joint box) 16 is provided for the front portion of each of right-hand and left-hand portions in a cabin 14. The electric junction box 16 includes an individual computer (a control unit). The foregoing computer is connected to the engine computer 12 and a door computer 18 provided for each door 17 such that multiple communication is permitted.

Figure 2:
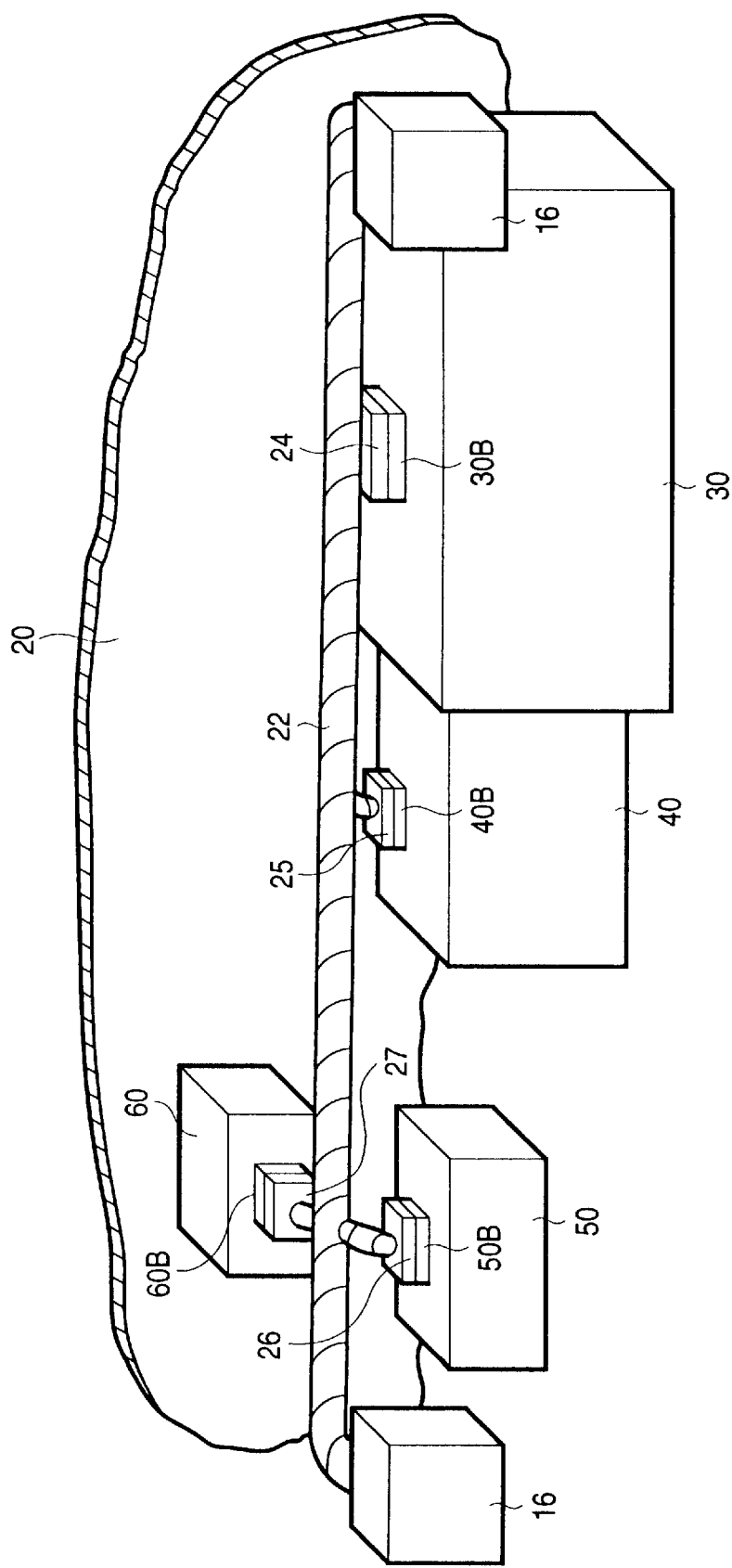
FIG. 2 is a perspective view showing a structure of the reverse side of an instrument panel for the vehicle.

An instrument panel 20 structured as shown in FIG. 2 is disposed in the front portion of the cabin 14. Moreover, an instrument-panel wire harness (hereinafter called "instrument panel harness") 22 is disposed on the reverse side of the instrument panel 20. The instrument panel harness 22 has a simple shape extending in the widthwise direction of the vehicle in substantially a straight line. The two ends of the instrument panel harness 22 are connected to the electric junction boxed 16. A plurality (four in the drawing) of branch lines are branched at intermediate positions of the instrument panel harness 22. Connectors 24, 25, 26 and 27 are disposed at the ends of the branched lines.

Among electronic units provided for the instrument panel 20, the air conditioner and electronic units disposed adjacent to the air conditioner are gathered as an air-conditioner sub-module 30 (that is, formed into a module) Similarly, electronic units provided for a center cluster disposed in the central portion of the instrument panel are gathered as a center cluster sub-module 40. Electronic units disposed adjacent to the steering wheel are gathered as a steering sub-module 50. Electronic units, such as meters and electronic units disposed adjacent to the meters, are gathered as a meter sub-module 60. The sub-modules 30, 40, 50 and 60 are provided with corresponding connectors 30B, 40B, 50B and 60B. The connectors 30B, 40B, 50B and 60B are connected to the connectors 24, 25, 26 and 27 of the instrument panel harness 22. Thus, the sub-modules 30, 40, 50 and 60 and the right and left electric junction boxes 16 are integrated through the instrument panel harness 22.

The specific structures of the sub-modules 30, 40, 50 and 60 will now be described.

Figure 3:
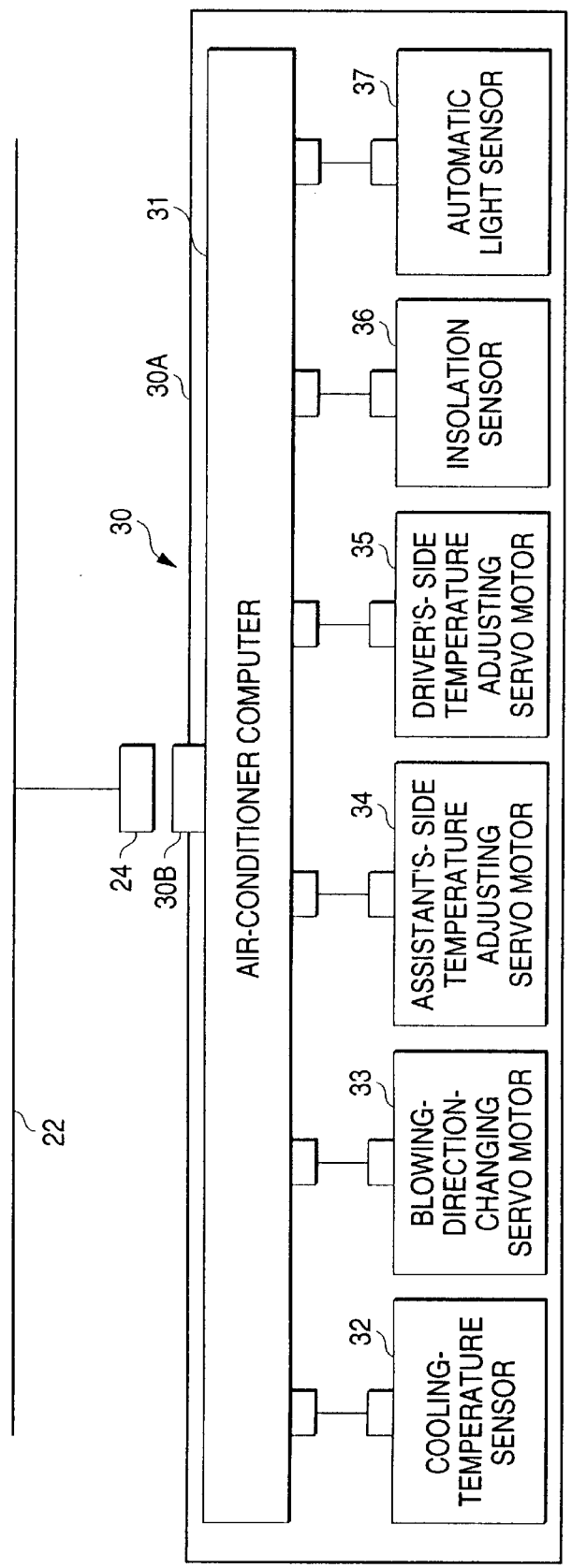
FIG. 3 is a block diagram showing the structure of an air-conditioner sub-module provided for the vehicle.

Air-conditioner sub-Module 30 is shown in FIG. 3.

The air-conditioner sub-module 30 incorporates a housing 30A. The connector 30B is secured to the housing 30A. Moreover, the housing 30A accommodates an air-conditioner computer (a control unit) 31, a cooling-temperature sensor 32, a blowing-direction changing servo motor 33, an assistant-seat-side temperature adjustment servo motor 34, a driver's-seat-side temperature adjustment servo motor 35, an insolation sensor 36 and an automatic-light sensor 37.

An air-conditioner computer 31 is connected to each terminal of the connector 30B through a power supply line and a signal line. The cooling-temperature sensor 32, the blowing-direction changing servo motor 33, the assistant-seat-side temperature adjustment servo motor 34, the driver t s-seat-side temperature adjustment servo motor 35, the insolation sensor 36 and the automatic-light sensor 37 are connected to the common air-conditioner computer 31 through the power supply line and the signal line so as to be integrated and controlled by the air-conditioner computer 31. When the connector 30B and the connector 24 of the instrument panel harness 22 are connected to each other, electric power is supplied from a battery to sequentially pass through the electric junction box 16, the instrument panel harness 22 and the connectors 24 and 30B so as to be supplied to the air-conditioner computer 31. Then, electric power is supplied from the air-conditioner computer 31 to the other electronic units 32 to 37. Moreover, multiple communication can be performed among the air-conditioner computer 31 and computers of the other sub-modules 40, 50 and 60 and the electric junction box 16.

Figure 4:
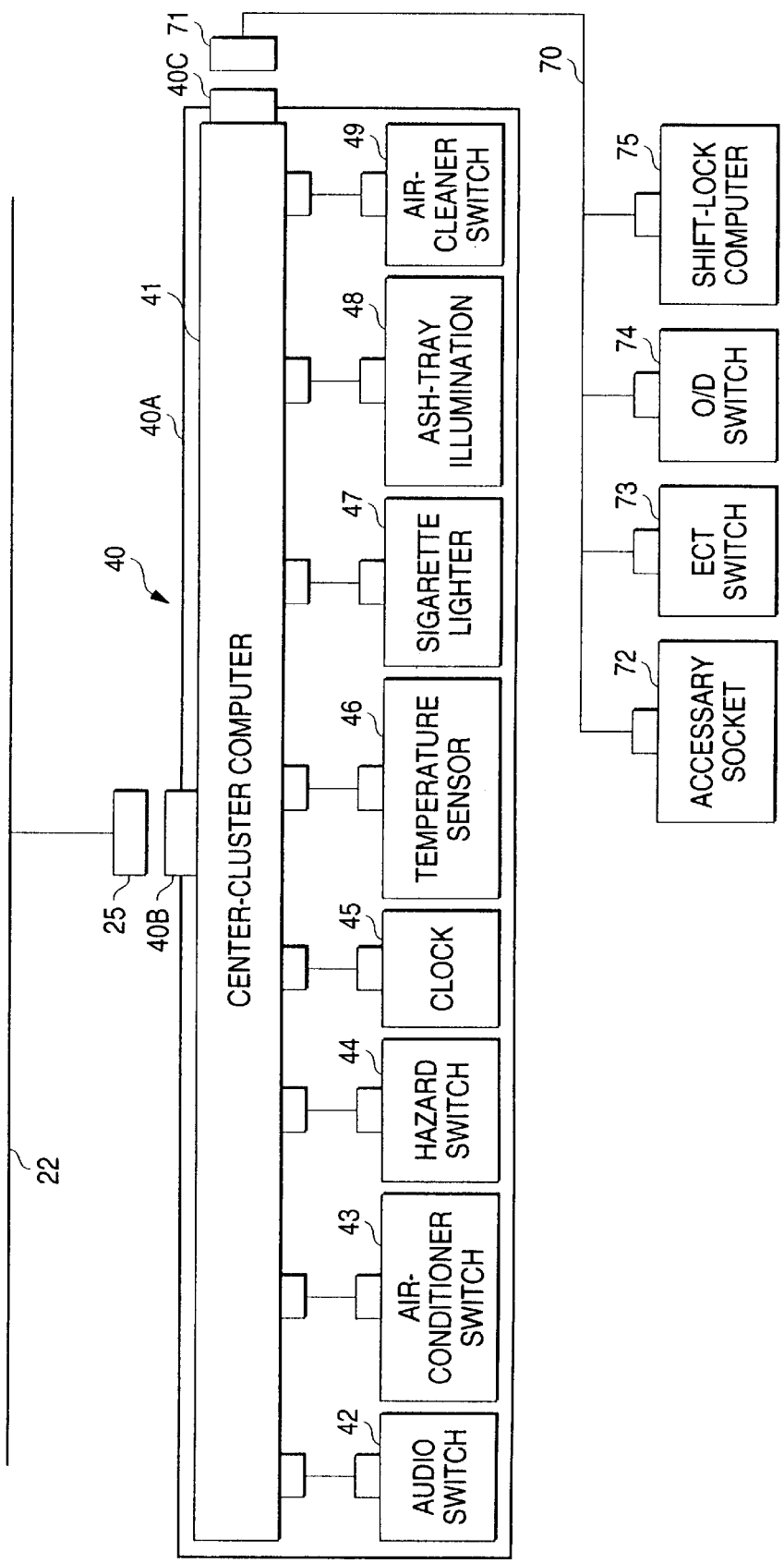
FIG. 4 is a block diagram showing the structure of a center-cluster sub-module provided for the vehicle.

Center Cluster Sub-Module 40 is shown in FIG. 4.

The center cluster sub-module 40 incorporates a housing 40A. The connector 40B is secured to the housing 40A. The housing 40A accommodates a center-cluster computer (a control unit) 41, an audio switch 42 (the switch or the body of the audio unit), an air-conditioner switch 43, a hazard switch 44, a clock 45, a temperature sensor 46, a cigarette lighter 47, an ashtray illumination 48 and an air-cleaner switch 49.

The center-cluster computer 41 is connected to each terminal of the connector 40B through the power supply line and the signal line. The audio switch 42, the air-conditioner switch 43, the hazard switch 44, the clock 45, the temperature sensor 46, the cigarette lighter 47, the ashtray illumination 48 and the air-cleaner switch 49 are connected to the common center-cluster computer 41 through the power supply line and the signal line so as to be integrated and controlled by the center-cluster computer 41. When the connector 40B and the connector 25 of the instrument panel harness 22 are connected to each other, electric power is supplied from the battery to sequentially pass through the electric junction box 16, the instrument panel harness 22 and the connectors 25 and 40B so as to be supplied to the center-cluster computer 41. Then, electric power is supplied from the center-cluster computer 41 to the other electronic units 42 to 49. Moreover, multiple communication can be performed among the center-cluster computer 41 and the computers of the other sub-modules 30, 50 and 60 and the electric junction box 16.

A connector 40C is secured to the housing 40A. Also the connector 40C is connected to the center-cluster computer 41. A connector 71 provided for a console sub-harness 70 which is individual from the instrument panel harness 22 can be connected to the connector 40C. In the connected state, also electronic units, such as an accessory socket 72, an ECT switch 73, an O/D switch 74 and a shift-lock computer 75, are connected to the center-cluster computer 41 through the console sub-harness 70. Also the foregoing electronic units 72 to 75 are integrated and controlled by the center-cluster computer 41.

As described above, the present invention may be structured such that a portion of the electronic units constituting the sub-modules are disposed on the outside of the housings.

Figure 5:
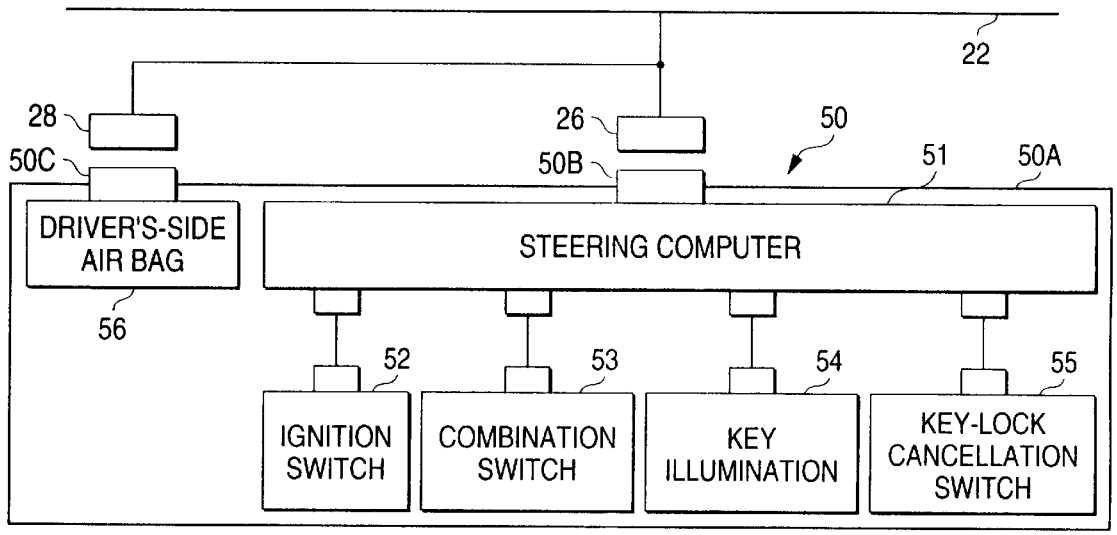
FIG. 5 is a block diagram showing the structure of a steering sub-module provided for the vehicle.

Steering Sub-Module 50 is shown in FIG. 5

The steering sub-module 50 incorporates a housing 50A. The connector 50B is secured to the housing 50A which accommodates a steering computer (a control unit) 51, an ignition switch 52, a combination switch 53 including a wiper switch and a light control switch, a key illumination 54 and a key-lock cancellation switch 55.

The steering computer 51 is connected to each terminal of the connector 50B through the power supply line and the signal line. The ignition switch 52, the combination switch 53, the key illumination 54 and the key-lock cancellation switch 55 are connected to the common steering computer 51 through the power supply line and the signal line so as to be integrated and controlled by the steering computer 51. When the connector 50B and the connector 26 of the instrument panel harness 22 are connected to each other, electric power supplied from the battery sequentially passes through the electric junction box 16, the instrument panel harness 22 and connectors 26 and 50B so as to be supplied to the steering computer 51. Then, electric power is supplied from the steering computer 51 to the other electronic units 52 to 55. Moreover, multiple communication can be performed among the steering computer 51 and the computers of the other sub-modules 30, 40 and 60 and the electric junction box 16.

A connector 50C is secured to the housing 50A. A driver's-seat air bag 56 is connected to the connector 50C. On the other hand, a connector 28 individual from the connector 26 is provided for the instrument panel harness 22 so that the connection between the connector 28 and the connector 50C is permitted. In the foregoing connected state, an air-bag signal is directly (that is, passing through the steering computer 51 is inhibited) input from the instrument panel harness 22 to the driver's-seat air bag 56 through the connectors 28 and SOC. Thus, the driver's-seat air bag 56 can be operated.

As described above, the present invention may be structured such that the electronic units (that is, the electronic units except for the electronic units constituting the sub-modules) which are not integrated by the control unit (the steering computer 51 in the case shown in the drawing) are accommodated in the housing 50A together with the electronic units constituting the sub-modules.

Figure 6:
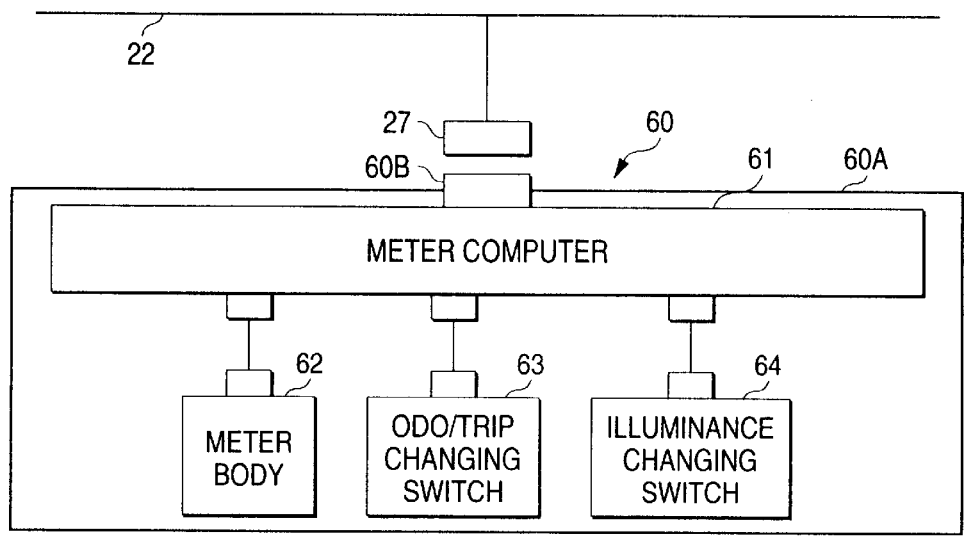
FIG. 6 is a block diagram showing the structure of a meter sub-module provided for the vehicle.

Meter Sub-Module 60 is shown in FIG. 6.

The meter sub-module 60 incorporates a housing 60A. The connector 60B is secured to the housing 60A which accommodates a meter computer (a control unit) 61, a meter body 62, an odo/trip changing switch 63 and a luminance changing switch 64.

The meter computer 61 is connected to each terminal of the connector 60B through the power supply line and the signal line. The meter body 62, the odo/trip changing switch 63 and the luminance changing switch 64 are connected to the common meter computer 61 through the power supply line and the signal line so as to be integrated and controlled by the meter computer 61. When the connector 60B and the connector 27 of the instrument panel harness 22 are connected to each other, electric power is supplied from the battery so as to sequentially pass through the electric junction box 16, the instrument panel harness 22 and the connectors 27 and 60B so as to be supplied to the meter computer 61. Then, electric power is supplied from the meter computer 61 to the other electronic units 62 to 64. Moreover, multiple communication among the meter computer 61 and the computers of the sub-modules 30, 40 and 50 and the electric junction box 16 is possible.

Among the above-mentioned sub-modules, the specific wiring structure in the center cluster sub-module 40 will now be described with reference to FIG. 7.

Figure 7:
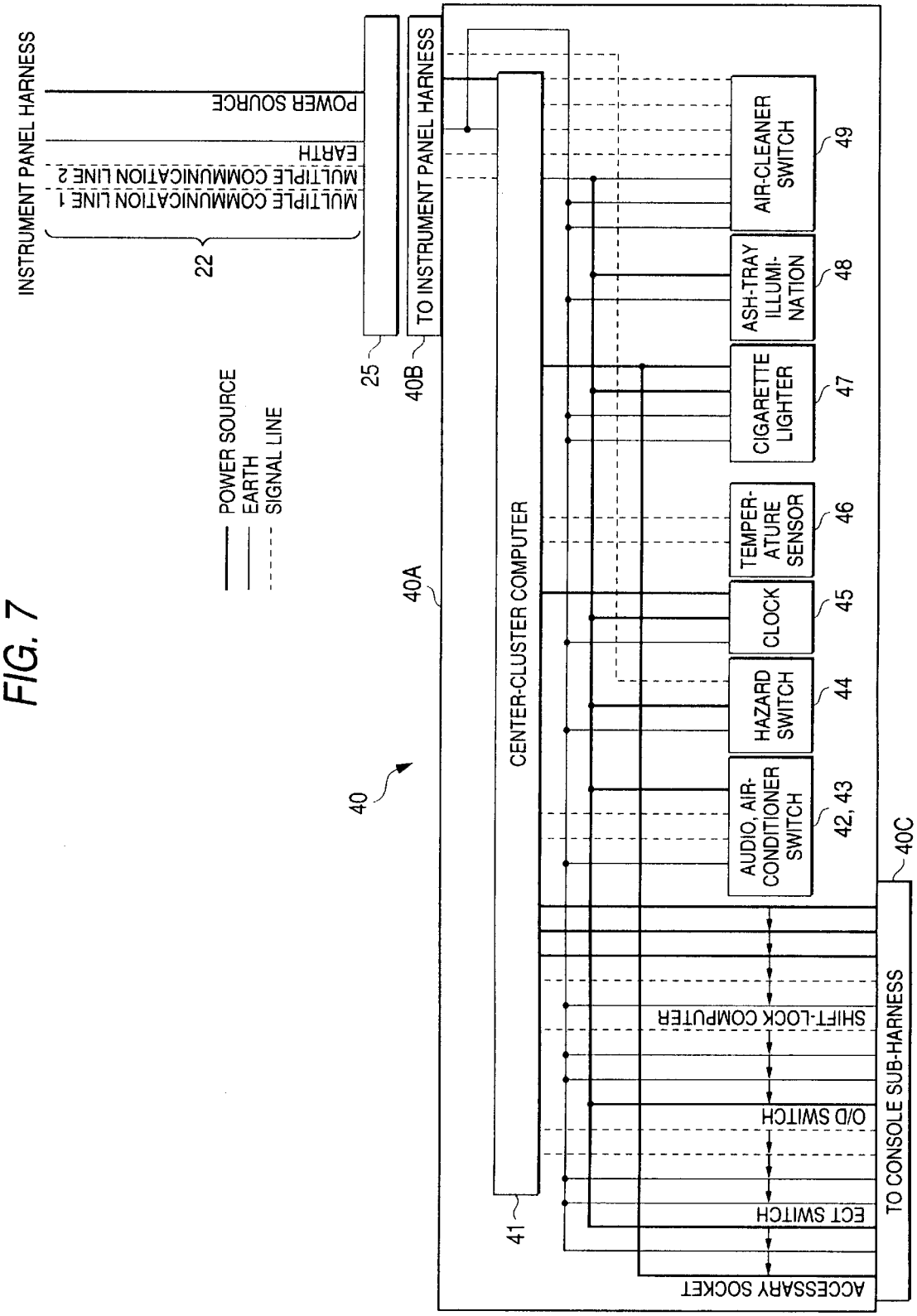
FIG. 7 is a circuit diagram showing a specific wiring structure in the center cluster sub-module.

As shown in FIG. 7, electric power supplied from the instrument panel harness 22 through the connectors 25 and 40B is supplied to only the center-cluster computer 41. On the other hand, electric power is supplied from the center-cluster computer 41 to all of the other electronic units 42 to 49 in the other housings and the electronic units adjacent to console sub-harness 40C. Supply of electric power may be performed without passing through the center-cluster computer 41. Grounding is performed such that passing through the center-cluster computer 41 is inhibited and direct passing through the connectors 40B and 25 is performed.

All of the electronic units and the connector 40C except for the center-cluster computer 41 and the hazard switch 44 are connected to the center-cluster computer 41 through the signal lines. Thus, communication of signals among the foregoing electronic units and electronic units of the console sub-harness 70 connected to the connector 40C is permitted.

The center-cluster computer 41 is connected to a multiple communication line in the instrument panel harness 22 through the multiple communication line in the module and the connectors 40B and 25. Therefore, multiple communication among the center-cluster computer 41 and the computers 31, 51 and 61 of the other sub-modules and the computer in the electric junction box 16 is permitted.

The above-mentioned structure enables wiring in the vicinity of the instrument panel 20 to be performed by, for example, the following procedure.

(1) The sub-modules 30 to 60 are previously assembled on the outside of the line for manufacturing the instrument panel. The layout of the electronic units of the sub-modules 30 to 60 is previously made to be the same as the final layout when the foregoing electronic units are mounted on the instrument panel 20.

(2) The electric junction box 16 and the instrument panel harness 22 are disposed with respect to the instrument panel 20.

(3) The sub-modules 30, 40, 50 and 60 are mounted on the instrument panel 20. Moreover, the connectors 24, 25, 26 and 27 of the instrument panel harness 22 are connected to the connectors 30B, 40B, 50B and 60B of each sub-module. Therefore, only four connectors must be connected when the connection among the sub-modules and the instrument panel harness 22 is established. The operations for connecting the other connectors, that is, the connection between the connector 40C of the center cluster sub-module 40 and the connector 71 of the console sub-harness 70, that between the connector 50C of the steering sub-module 50 and the connector 28 of the instrument panel harness 22 and those between the connectors of the other electronic units and the connectors of the harness are established so that wiring in the vicinity of the instrument panel 20 is completed.

The thus-constituted wiring structure permits the mutual multiple communication among the sub-module computers 31, 41, 51 and 61 of the sub-module and the computer in the electric junction box 16 to be performed. Moreover, communication of signals among the controlling computer in each sub-module and the other electronic units is performed. Thus, communication among the electronic units can be performed similarly to the conventional structure. The specific state of the communication will now be described.

(1) An example of Communication between One Sub-Module:

In the air-conditioner sub-module 30 shown in FIG. 3, a detection signal supplied from the cooling-temperature sensor 32 is input to the air-conditioner computer 31. In response to the detection signal, feed-back control signals are output from the air-conditioner computer 31 to the temperature adjustment servo motors 34 and 35.

Figure 8A:
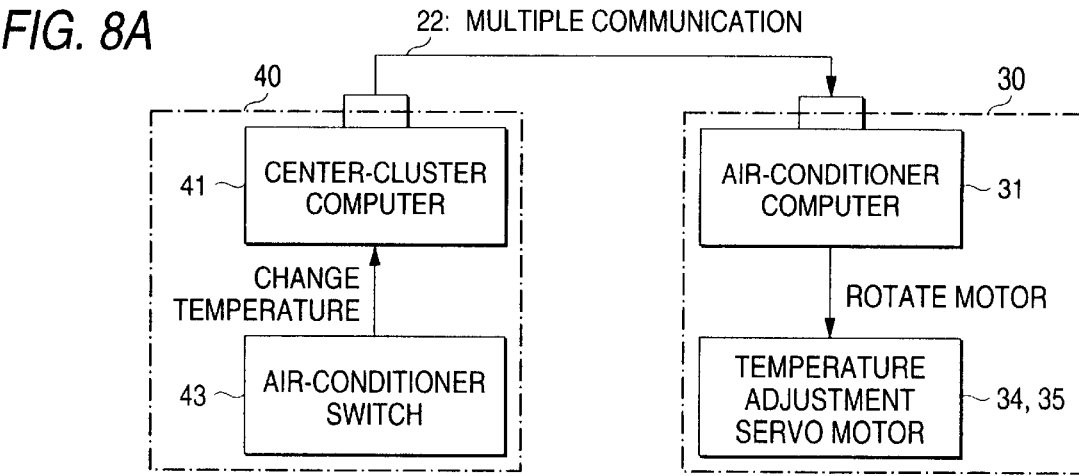
FIGS. 8A, 8B and 8C are block diagrams showing example of communication permitted by the foregoing wiring structure.

(2) An example is shown in FIG. 8A of Communication Between Sub-Modules. when, for example, the temperature changing switch of the air-conditioner switch 43 of the center cluster sub-module 40 is operated, a temperature-changing instruction signal is input to the center-cluster computer 41. The center-cluster computer 41 transmits a multiple signal to the air-conditioner computer 31 of the air-conditioner sub-module 30 through the multiple communication line in the instrument panel harness 22. In response to this, the air-conditioner computer 31 outputs a motor rotating signal to each of the assistant-seat-side temperature adjustment servo motor 34 and the driver's-seat-side temperature adjustment servo motor 35. Thus, the temperature adjustment operation is performed. As a result, the temperature adjustment servo motors 34 and 35 of the body of the air conditioner are operated in synchronization with the operation of the air-conditioner switch 43.

Other examples of the multiple communication between the sub-module computers are exemplified by an operation for turning on an illumination lamp of the meter sub-module 60 (or the center cluster sub-module 40) in synchronization with an operation for switching on the lamp switch of the combination switch 53 of the steering sub-module 50. Another operation is included with which an indicator lamp of the meter body 62 is turned on in synchronization with the operation for switching on a cruise control switch of the combination switch 53 or a shift pattern switch (omitted in FIG. 4) of the center cluster sub-module 40.

Figure 8B:
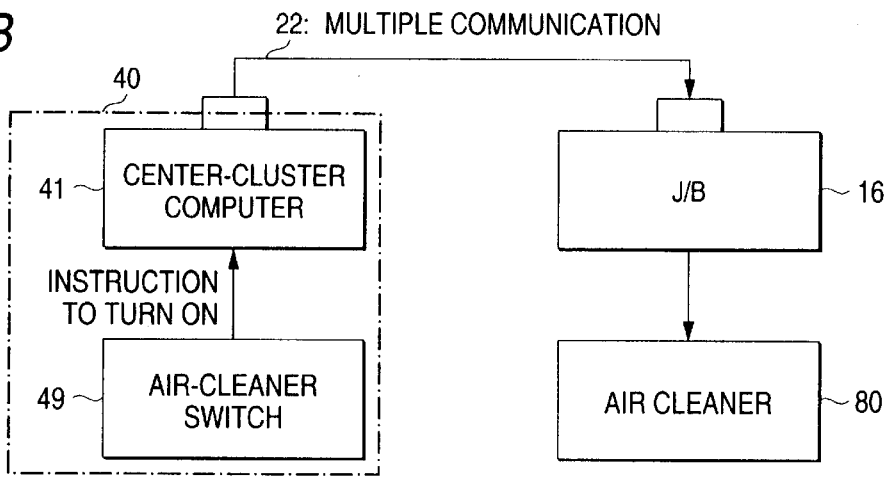

(3) An example of Transmission from Sub-Module to Electric Junction Box 16 is shown in FIG. 8B: When the air-cleaner switch 49 of the center cluster sub-module 40 is switched on, a switching signal is input to the center-cluster computer 41. The center-cluster computer 41 transmits a multiple signal to the computer in the electric junction box 16 through a multiple communication line in the instrument panel harness 22. In response to this, the computer in the electric junction box outputs a control signal to the air cleaner 80 to operate the air cleaner 80. As a result, the air cleaner 80 is operated in synchronization with the operation of the air-cleaner switch 49.

Other examples are exemplified by an operation for rotating the wiper motor in synchronization with the operation of the combination switch 53 of the steering sub-module 50. An operation is included with which a starter motor is rotated in synchronization with the operation of the ignition switch 52.

Figure 8C:
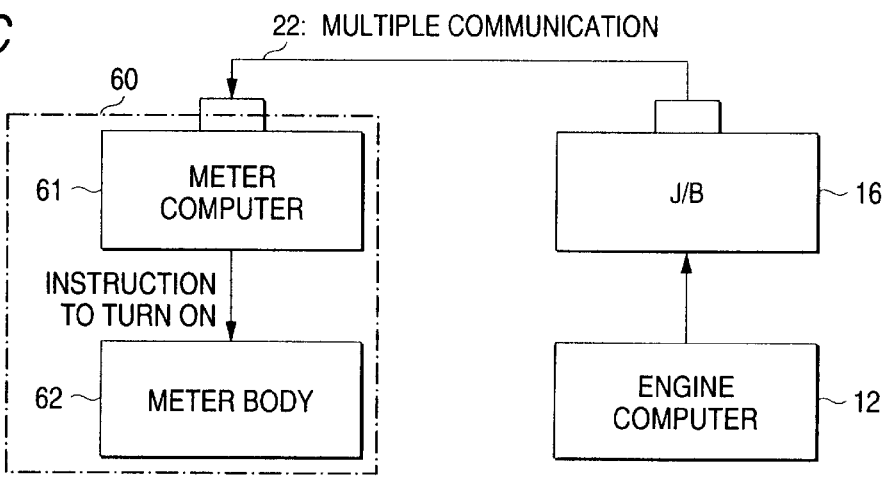

(4) An example of Transmission from Electric Junction box 16 to a Sub-Module is shown in FIG. 8C: the engine computer 12 receives any one of a variety of detection signals, such as a car-speed detection signal, a detection signal indicating the number of revolution of the engine, a detection signal indicating a residual quantity of gasoline or a detection signal indicating the water temperature of the engine. Thus, the engine computer 12 inputs an information signal concerning the contents of the detection to the computer in the electric junction box 16. In response to this, the foregoing electric junction box computer transmits a multiple signal to the meter computer 61 of the meter sub-module 60 through the multiple communication line in the instrument panel harness 22. The meter computer 61 displays a result of the detection by operating an actuator of the meter body 62 or by turning on any one of display lamps (a lamp for displaying the shift position, check engine, ABS, a seat belt, a half door, a parking brake, the battery, the air bag, the high beam or the lamp disconnection detection).

Also supply of electric power to the other electronic units is performed through the battery, the electric junction box 16, the instrument panel harness 22, each of the sub-module computers 31, 41, 51 and 61 and each electronic unit.

The foregoing strength attains the following effects.

With respect to the shape and structure of the instrument panel harness 22, the conventional wiring structure is arranged such that the shape of the instrument panel harness 22 is the branched structure for each electronic unit. Moreover, terminal connectors must be provided by the number corresponding to the number of the electronic units. Therefore, if a large number of electronic units must be provided, the shape and structure of the instrument panel harness 22 become too complicated. What is worse, the weight of the instrument panel harness 22 is enlarged excessively to easily treat the instrument panel harness 22.

Figure 9:
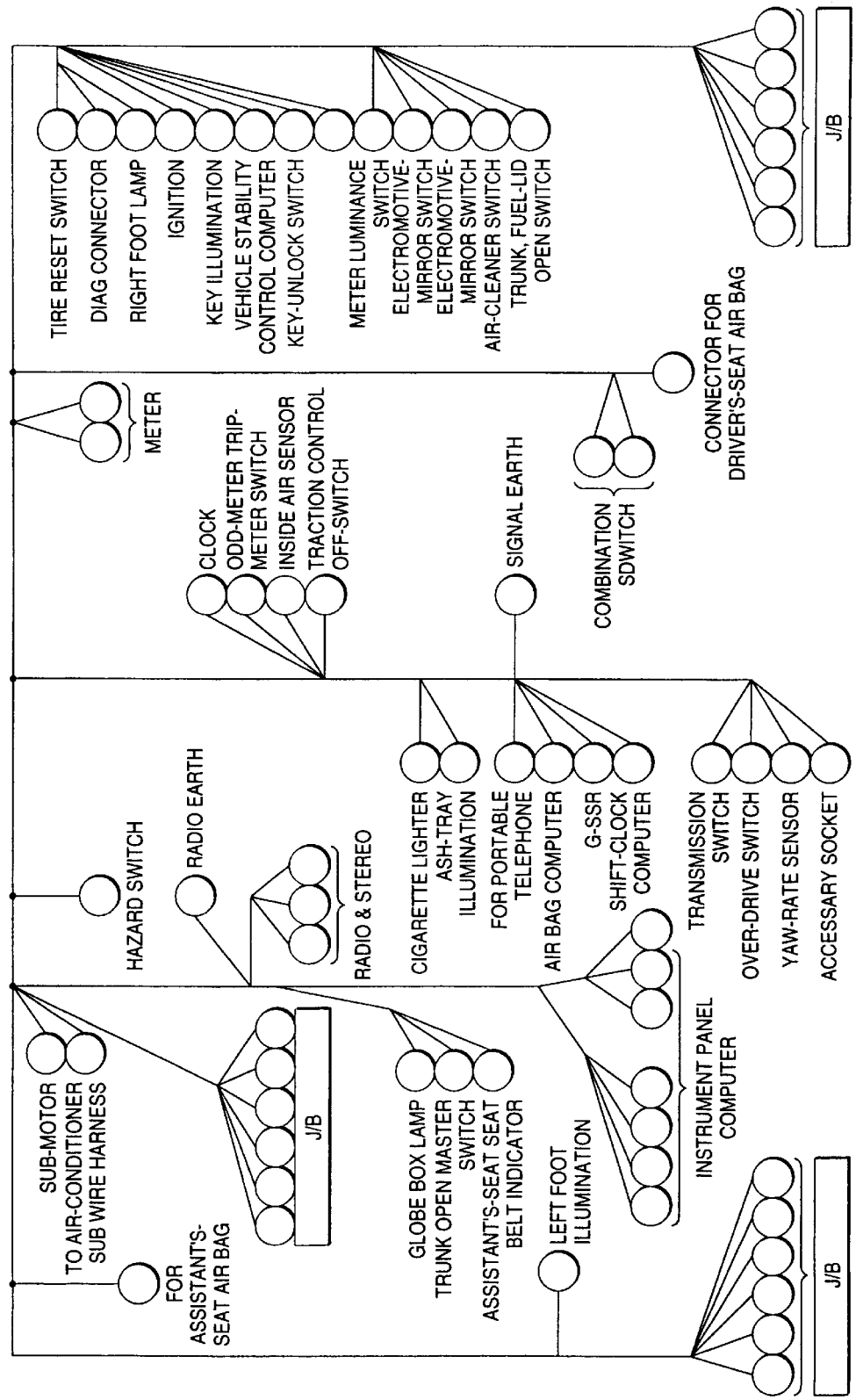
FIG. 9 is a circuit diagram showing a conventional wiring structure provided for the instrument panel.
Figure 10:
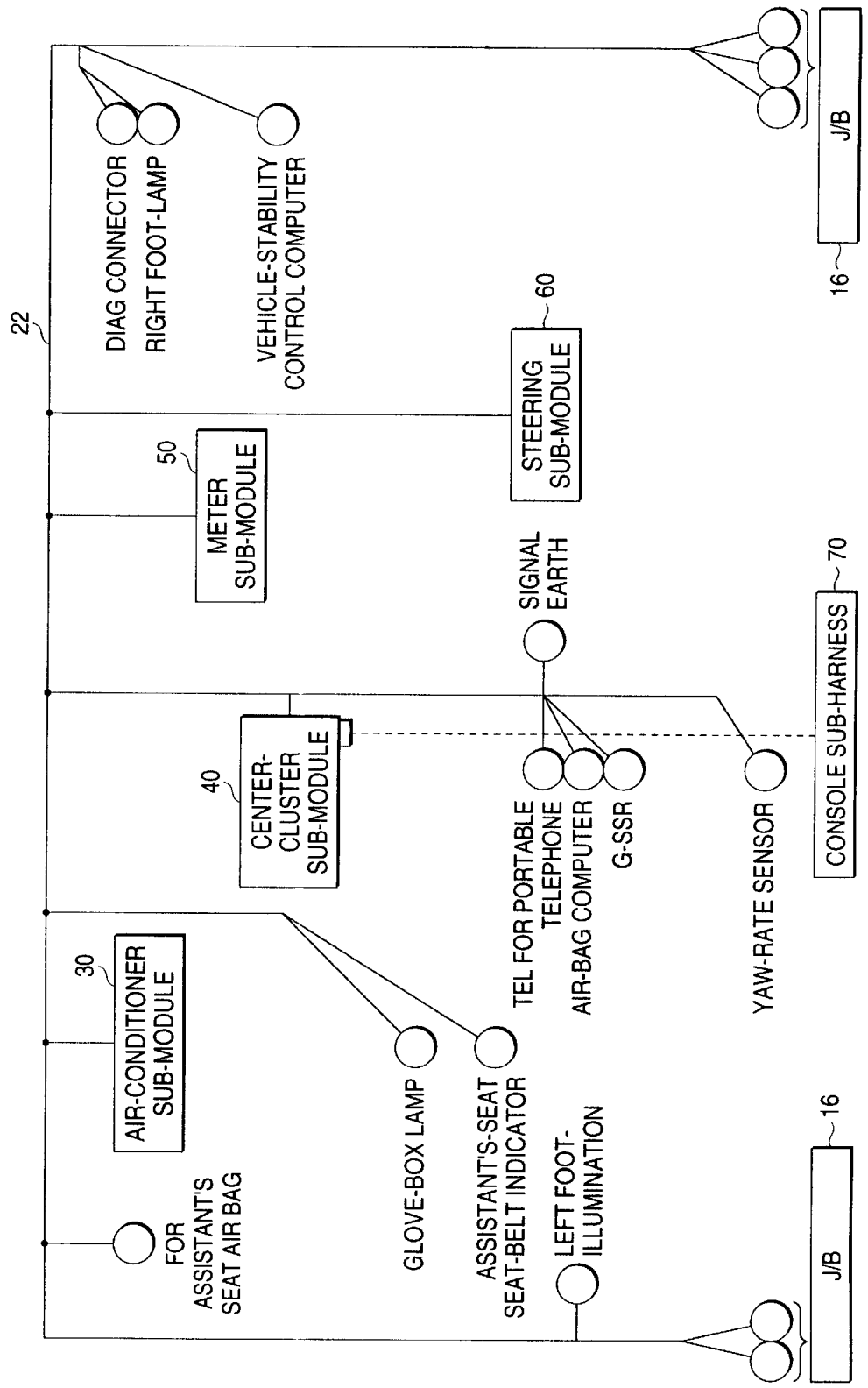
FIG. 10 is a circuit diagram showing a wiring structure provided for the instrument panel shown in FIGS. 1 to 8.

On the other hand, the present invention's wiring configuration, as shown in FIG. 10, is structured such that the plural electronic units concerning one another is integrated into sub-modules 30 to 60. Moreover, the network is formed by permitting the multiple communication. Hence the number of branched lines and connectors required for the instrument panel harness 22 can significantly be reduced. For example, compare the structure shown in FIG. 9 with that shown in FIG. 10. Therefore, the shape of the harness 22 according to the invention can considerably be simplified and the overall weight can be reduced. As a result, the instrument panel harness 22 can more easily be handled.

With respect to the wiring operation, the conventional wiring structure, of, for example, FIG. 9. requires operations connecting the connectors of the various electronic units and the connectors of the instrument panel harness 22 to one another on the manufacturing line according to the corresponding number of electronic units as a rule. Therefore, an excessive amount of labor is required. On the other hand, the wiring operation of the present invention reduces the manufacturing labor by unifying and integrating the electronic unit sub-modules with the respective sub-module computers 31, 41, 51 and 61 before assembly of the instrument panel. Thus, a simple operation is required on the manufacturing line with which the instrument-panel-side connectors 24 to 27 and the connectors of the sub-modules are connected to one another. Hence it follows that a wide communication network can quickly be formed. As a result, the manufacturing efficiency can considerably be improved. Therefore, handling of the instrument panel harness 22 can significantly be facilitated.

With respect to the versatility of the instrument panel harness 22, when the types or the layout of the electronic units for the instrument panel 20 is changed to be adapted to a required grade, the conventional structure requires changing the shape and structure of the instrument panel harness 22 to adapt the electronic units to the types and layout desired. Therefore, several instrument panel harnesses 22 must be provided according to the types or grade desired. As a result, the conventional wiring structure is not economical. On the other hand, the wiring structure shown in FIGS. 1 to 8 enables adaptation to the grade to be performed easily by only changing the sub-modules. Therefore, a common instrument panel harness 22 can always be employed. Hence it follows that the present invention is significantly more economical and adaptable than the conventional wiring structure and the mass production of the invention can easily be performed.

The embodiment of the present invention is not limited to the foregoing type. The following examples may be employed.

(1) The present invention permits omission of any one of the foregoing sub-modules regardless of the types and number of sub-modules. Moreover, other sub-modules (for example, a glove-box sub-module and the air-bag sub-module) may be added. Also the electronic units constituting each sub-module may arbitrarily be selected.

(2) The connection between each sub-module and the electric junction box may arbitrarily be omitted. If the omitted connection is employed to permit multiple communication between each sub-module and the electric junction box, the network between the electronic unit for the instrument panel and the other electronic unit can be simplified. Hence it follows that a further satisfactory effect can be obtained.

(3) The present invention permits arbitrary determination of the shape and wiring region of the instrument panel harness 22. The instrument panel harness 22 according to the present invention is arranged in the widthwise direction of the vehicle. The arrangement is performed in the present invention such that the right and left electric junction boxes 16 are connected to each other and the sub-modules are connected to the intermediate positions of the instrument panel harness 22. Thus, the communication network among the sub-modules and the electric junction boxes can be formed with a simple structure.

As described above, according to the present invention, there is provided the wiring structure for an instrument panel of a vehicle having a plurality of electronic units disposed in the instrument panel, the wiring structure for an instrument panel of a vehicle comprising: a plurality of sub-modules constituted by connecting a plurality of electronic units for the instrument panel to a common control unit, wherein the control units of the sub-modules are connected to a common wire harness so that multiple communication is performed among the plural control units. Therefore, effects can be attained in that the wiring can be simplified, weight reduction of the wiring structure is permitted and the wiring operation of the various units and sub-modules can be facilitated. Moreover, flexible adaptation of the wiring harness structure to changes is permitted.

What is claim is:

1. A wiring structure for an instrument panel of a vehicle, the instrument panel having a plurality of electronic units disposed in housings in the instrument panel, the wiring structure for an instrument panel comprising:

a plurality of sub-modules having a plurality of electronic units connected to a common sub-module control unit, wherein each sub-module control unit is connected to a common wire harness having two opposed ends to perform multiple communication among the plurality of sub-module control units.

2. The wiring structure for an instrument panel of a vehicle according to claim 1, further comprising:

a first connector provided for each sub-module, for detachable connection to a corresponding second connector provided on the wire harness, the connections of the first and second connectors enable the respective sub-module control units of each sub-module to be connected to one another to perform multiple communication.

3. The wiring structure for an instrument panel of a vehicle according to claim 1, wherein an electric junction box for the instrument panel is connected to the wire harness to perform multiple communication between a control unit of the electric junction box and the sub-module control unit of at least one sub-module.

4. The wiring structure for an instrument panel of a vehicle according to claim 3, wherein the wire harness is allowed to pass close by the instrument panel so as to be arranged in the widthwise direction of the vehicle, the electric junction box is connected to each of the opposed two ends of the wire harness, and the sub-module control unit of each sub-module is connected to an intermediate portion of the wire harness.

5. The wiring structure for an instrument panel of a vehicle according to claim 1, wherein a portion of each electronic unit constituting a sub-module is disposed outside of the housings.

* * * * *